Oct. 11, 1938.  R. J. BUSH  2,132,935
BRAKE VALVE
Filed May 20, 1936   3 Sheets-Sheet 1
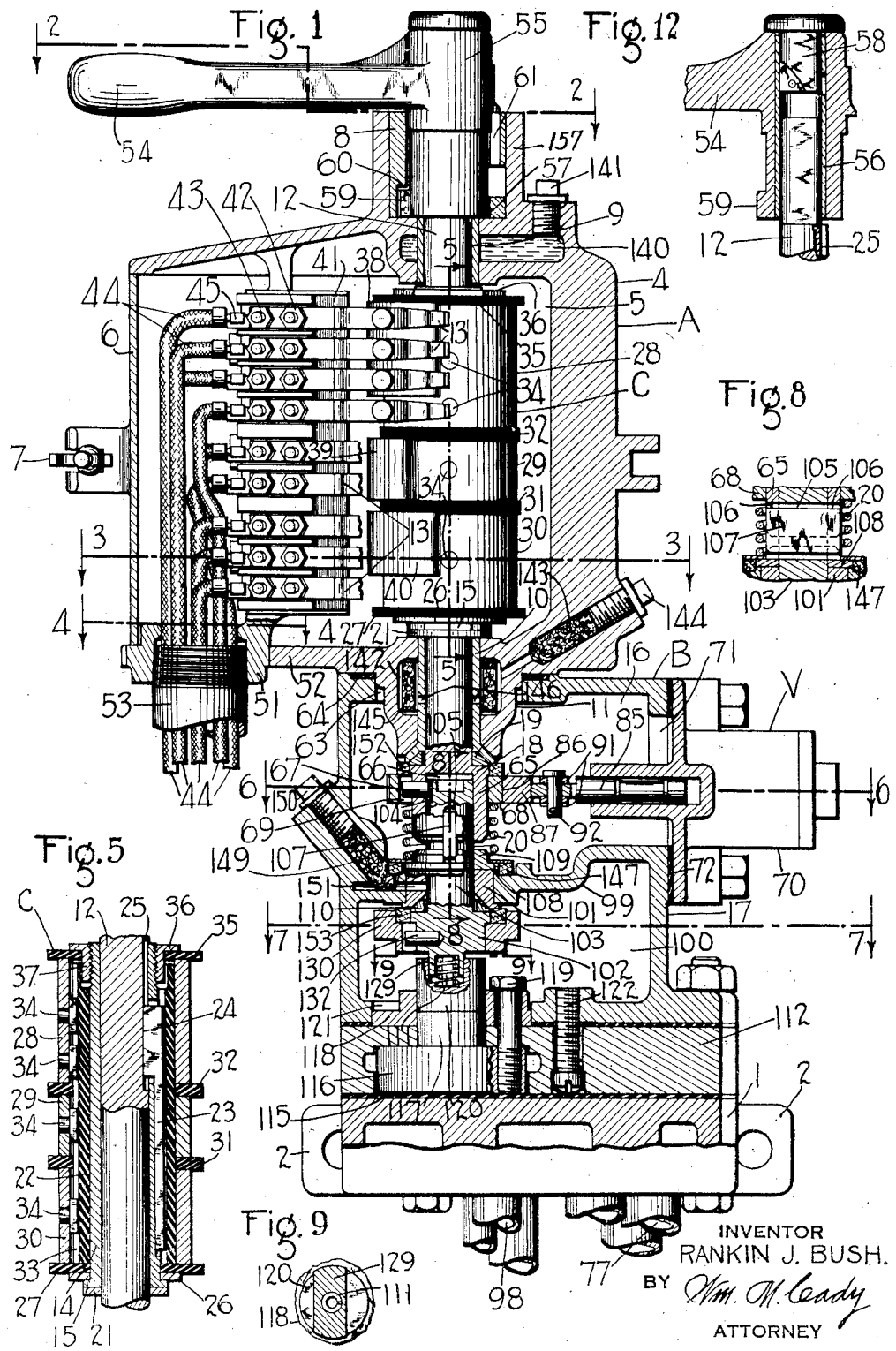
INVENTOR
RANKIN J. BUSH.
BY Wm. M. Cady
ATTORNEY

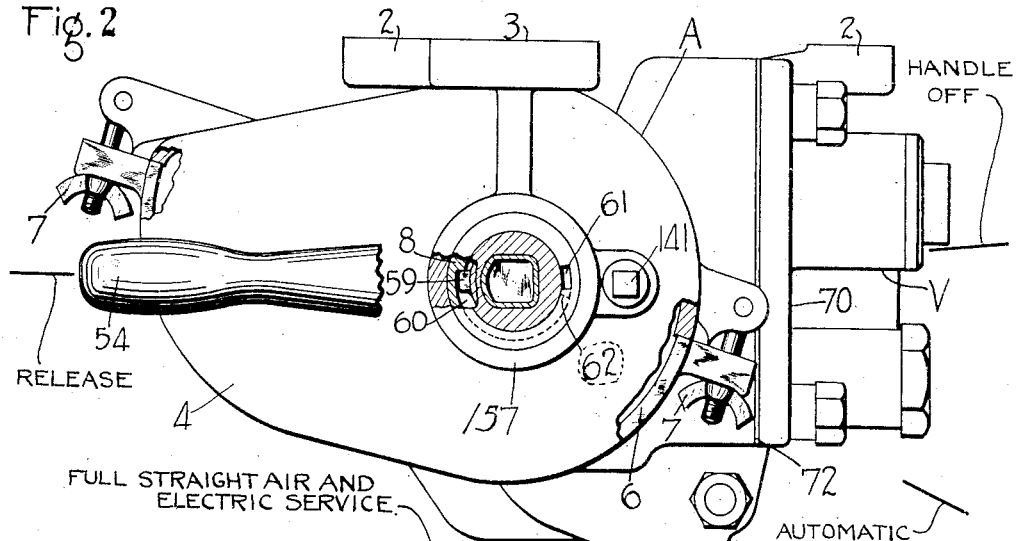
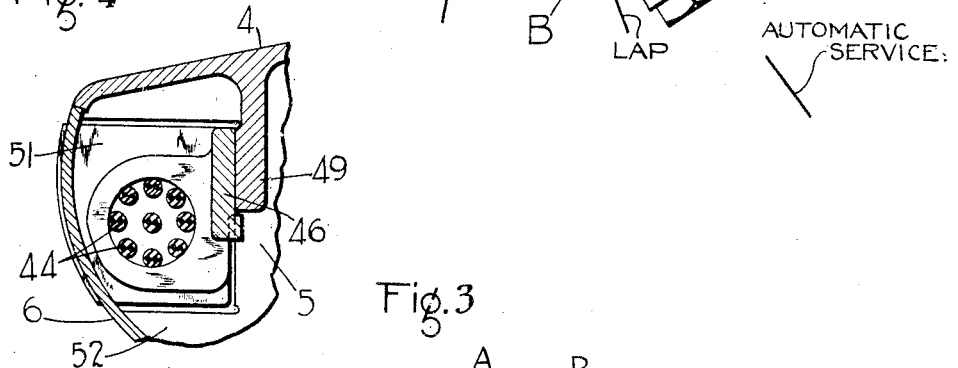
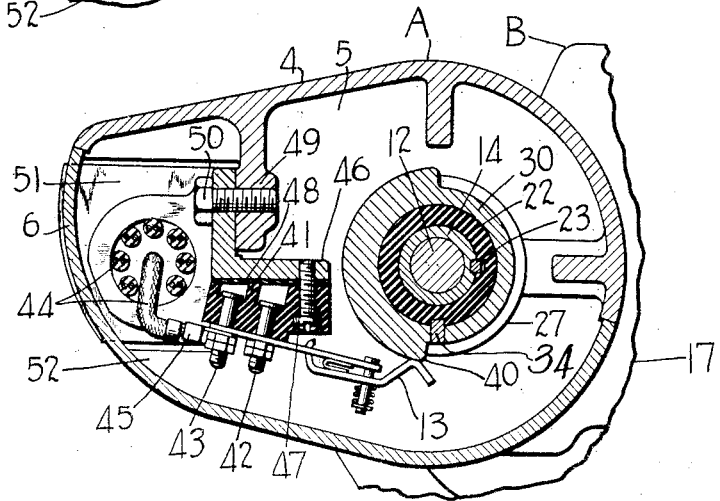

Oct. 11, 1938.   R. J. BUSH   2,132,935
BRAKE VALVE
Filed May 20, 1936   3 Sheets-Sheet 3
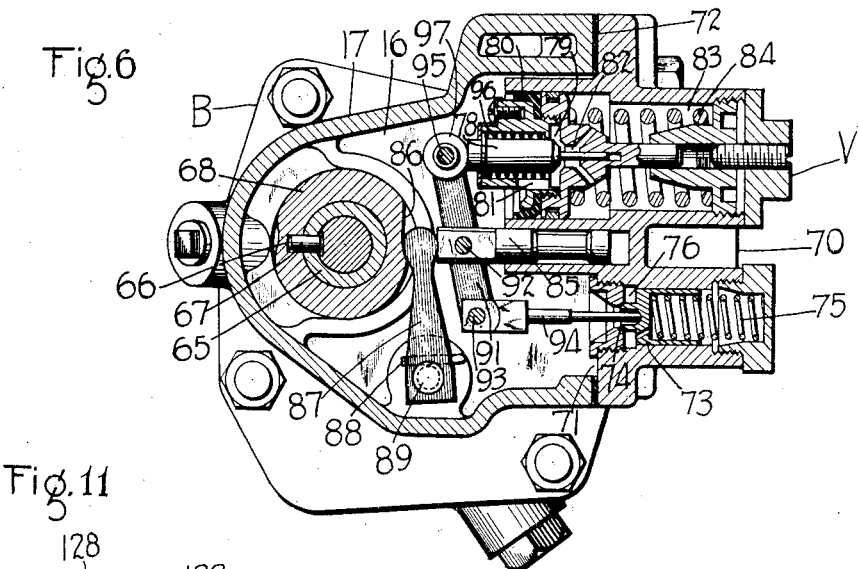
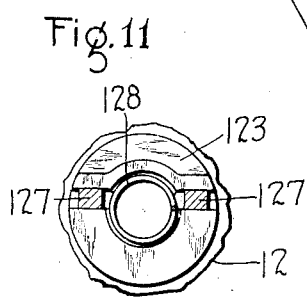
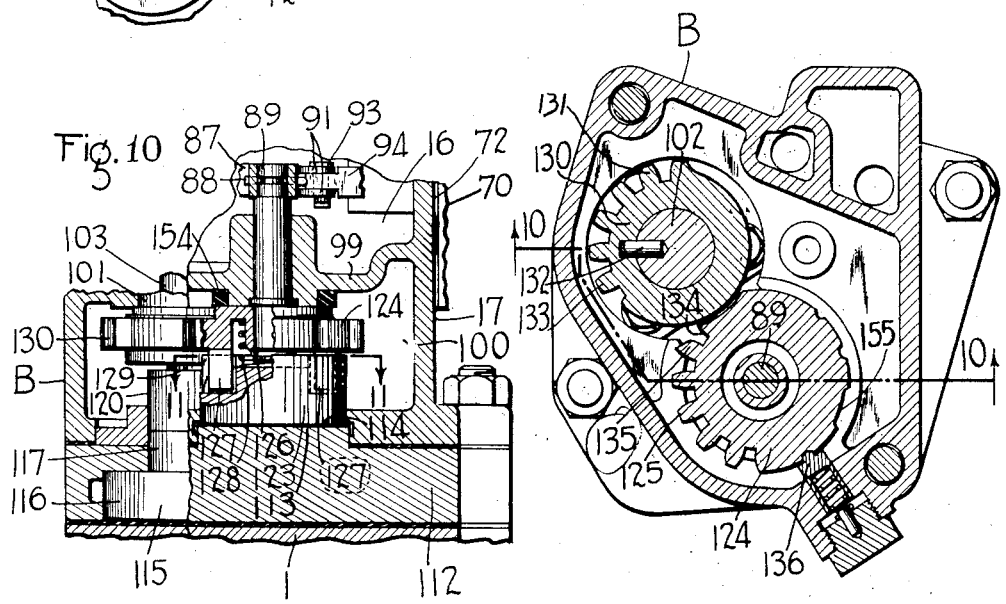
INVENTOR
RANKIN J. BUSH.
BY Wm. M. Cady
ATTORNEY Patented Oct. 11, 1938

2,132,935

UNITED STATES PATENT OFFICE 2,132,935

BRAKE VALVE

Rankin J. Bush, Jeannette, Pa., assignor to The Westinghouse Air Brake Company, Wilmerding, Pa., a corporation of Pennsylvania Application May 20, 1936, Serial No. 80,785

24 Claims. (Cl. 303—56)

This invention relates to brake controllers and more particularly to the type which are manually operated for controlling the brakes on a vehicle.

It has heretofore been proposed to provide on a vehicle a plurality of different types of braking systems, such as a fluid pressure braking system, a system embodying magnetic track shoes, and a dynamic braking system wherein the usual propulsion motors on a vehicle are employed as generators to provide braking, and in connection with such a plurality of braking systems means have been provided whereby the different braking systems may be manually controlled. One system of this general type is disclosed in the pending application of Ellis E. Hewitt, Serial No. 4,008, filed January 30, 1935.

The principal object of the present invention is to provide an improved, manually operated brake controller for use in controlling a plurality of different braking systems, such as above described.

Other objects and advantages will be apparent from the following more detailed description of the invention.

In the accompanying drawings: Fig. 1 is a vertical sectional view of a manually operated brake controller embodying the invention; Fig. 2 is a plan view of the brake controller shown in Fig. 1 with a portion shown in section as taken on line 2—2 in Fig. 1; Figs. 3 to 9 are sectional views taken in Fig. 1 on lines 3—3, 4—4, 5—5, 6—6, 7—7, 8—8, and 9—9, respectively; Fig. 10 is a sectional view taken on the line 10—10 in Fig. 7; Fig. 11 is a sectional view taken on the line 11—11 in Fig. 10; and Fig. 12 is a sectional view taken through the socket portion of the manually operated handle.

The brake controller shown in the drawings comprises, in general an electric brake controller portion A and a fluid pressure brake controller portion B secured together and carried by a pipe bracket 1. Mounting lugs 2 are provided on the pipe bracket 1 and a mounting lug 3 is provided on the electric controller portion A and through the medium of these lugs the brake controller is adapted to be secured to a vehicle.

The electric brake controller portion A comprises a casing 4 having a chamber 5 one side wall of which is formed by a removable cover 6 normally secured to said casing by means of thumb screws 7.

The casing 4 is provided with an upwardly extending projection 157 having a bore lined with a vertically disposed sleeve 8 which is open at both ends. A bushing 9 is provided in the top wall of casing 4 and has a bore in axial alignment with that of sleeve 8. A bushing 10 is provided in a suitable bore which extends through the bottom wall of casing 4 and through a depending portion 11 of said casing, said bushing having a bore in axial alignment with that through bushing 9. An operating shaft 12 is disposed to rotate in the bushings 9 and 10 and extends through chamber 5 and sleeve 8. The lower end of the shaft 12 extends into a chamber 16 formed within the casing 17 of the fluid pressure brake controller portion B and is provided in said chamber with an annular flange 18 between which and the lower flared end of bushing 10 is disposed a sealing washer 19. A spring 20 is provided in chamber 16 urging the flange 18 against the washer 19 and thereby defining the normal position of the shaft 12.

A rotatable contactor or drum C is secured to the shaft 12 in chamber 5 between the spaced bushings 9 and 10 and is adapted to be rotated by said shaft for making and breaking electrical contacts with a plurality of spaced, stationary, flexible contact fingers 13 through the medium of which the electric brakes on a vehicle are adapted to be controlled.

The contactor C comprises a sleeve 14, preferably made of a wear resisting material such as steel, slidably mounted on the shaft 12 and having at its lower end an outwardly extending annular flange 15 between which and the casing is interposed a bearing washer 21.

A sleeve 22, made of any suitable electrical insulating material, is slidably mounted on the sleeve 14 and is secured thereto against relative rotational movement by means of a key 23 which is disposed in aligned slots in the sleeves 14 and 22. The key 23 is provided adjacent one end with a tongue 24 which extends through the wall of sleeve 14 and into a slot 25 in the shaft 12 whereby the sleeve 14 is secured to the shaft against relative rotational movement. The slot 25 is open at its upper end as clearly shown in Figs. 1 and 12 of the drawings.

A metal supporting washer 26 is disposed over the sleeve 14 in engagement with the flange 15 of said sleeve and an insulating ring 27 of greater diameter than the sleeve 22 is interposed between the lower end of said sleeve and the washer 26.

Three ring-like contact members or conductors 28, 29 and 30 are slidably mounted on the sleeve 22 with the contact member 30 engaging the insulating ring 27 and with an insulating ring 31 interposed between the contact members 29 and 30 and a like insulating ring 32 between the contact members 29 and 28.

The sleeve 22 is provided externally with a longitudinally extending slot 33 and each of the contact members 28, 29 and 30 is provided with a slot aligned with the slot 33. Each of the contact members 28, 29 and 30 is secured to the sleeve 22 against relative rotational movement by a key 34 which has a head portion disposed in slot 33 and the aligned slot in the respective contact member, the key also having a stem portion projecting into a suitable bore in the respective contact member for holding the key in position in the contact member. On account of the length of the contact member 28 two keys 34 are employed for the purpose just described.

An insulating ring 35 is disposed over the upper end of the sleeve 14 in engagement with the contact member 28, while a clamping nut having a flange 36 engaging the outer face of the ring 35 is provided with a sleeve 37 screw threaded to the end of sleeve 14 whereby the several contact members and insulating rings are securely clamped together between the flange 15 on one end of said sleeve and the flange 36 on the nut secured to the other end of said sleeve.

Before the contactor C is mounted on the shaft 12, the insulating sleeve 22, the contact members 28, 29 and 30, the insulating rings 27, 31, 32 and 35 and other parts forming this structure are adapted to be assembled and secured in place on the metal sleeve 14. Then with the casing 4 of the electric brake controller portion A removed from the casing 17 of the fluid pressure brake controller portion B and the shaft 12 removed from the casing 4, the assembled contactor C is placed in position in the casing 4. The shaft 12 is then inserted through the bushing 10 and into the contactor sleeve 14. The tongue 24 of key 23 in the contactor C is then lined up with the keyway or slot 25 in the shaft 12 following which the shaft is pushed through the contactor C and through the upper bushing 9 until the flange 18 on the lower end of said shaft is stopped by the sealing washer 19 which engages the lower flared end of the bushing 19. The shaft 12 is then held in this position by the spring 20 after the casing 17 is secured to the casing 4 as will be hereinafter described in greater detail.

It will be noted that the contactor C is built up or assembled from a plurality of simply constructed elements which provides a structure that is relatively simple and inexpensive to manufacture as compared to prior designs in which all parts of the contactor are molded or otherwise formed in one piece.

The contact members 28, 29 and 30 are provided with raised portions 38, 39 and 40, respectively, for engagement with the contact finger or fingers 13 which are aligned therewith. These raised portions are particularly located with respect to the location of the key 34 associated with each contactor so as to engage the contact finger or fingers 13 in the desired position of the drum. These raised portions are also of such width as to engage only the number of contact fingers desired. It will be evident that due to the built up structure of the contactor C, the position of contact members 28, 29 and 30 may be changed, or contactor members having raised portions such as 38, 39 and 40 located differently with respect to keys 34 may be employed, or contact members of different widths than shown in the drawings may be used, and even a greater number of contact members as, limited by the space between the insulating rings 27 and 35, may be used if desired, whereby any desired control of electric brakes, circuit breakers or the like may be obtained.

As an example of this adjustability of the contactor C to meet desired variations of control, it will be noted that the raised portion 40 on the contact member 30 is only wide enough to engage two contact fingers 13, whereas, if conditions required, a different contact member having a raised portion for engaging the three fingers 13 in line therewith might be employed in place of the contact member 30.

The flexible contact fingers 13 are spaced on and secured to a block 41 of insulating material by means of bolts 42 and 43, and each of these fingers is connected to a cable or electrical conductor 44 by means of a clip 45 secured to the respective conductor and finger by the bolt 43.

The insulating block 41 is secured to one leg of an L shaped member 46 by means of one or more screws 47, and between said block and leg is interposed an insulating plate 48. The other leg of member 46 is secured to a vertically disposed web 49 projecting into chamber 5 from the rear wall of the casing 4, by means of one or more screws 50.

The L shaped member 46 is provided on its lower end with a horizontally disposed, offset portion 51 which fits into an opening provided through the bottom wall 52 of the casing. This offset portion is provided with a vertically arranged opening in the outer end of which a cable conduit 53 is secured by screw threaded engagement. The several conductors 44 are carried through this conduit into the chamber 5 wherein each is connected to its respective finger 13 as above described.

With the L shaped member 46 and the associated offset portion 51 secured in position to the casing 4, and the removable cover 6 secured in place to said casing by means of the thumb screws 7, it will be noted that the electrical control portion of the brake controller is entirely enclosed within the chamber 5.

An important feature of the construction just described is that upon removal of the cover 6 and the bolt or bolts 50 which secured the L shaped member 46 to the casing web 49, the contact finger assembly, which includes the contact fingers 13, the insulating block 41, the L shaped member 46 and its offset portion 51, is then removable from the controller as a unit which facilitate changes in or rearrangement of parts thereof or replacement of parts thereof or of the contactor C.

The contactor C is adapted to be turned to various brake controlling positions through the medium of shaft 12 by a handle 54. This handle has a socket portion 55 adapted to freely fit the opening through sleeve 8 which is provided in the upwardly extending projection 157 of casing 4 and is adapted to normally engage a shoulder 57 provided on the casing 4. The socket portion 55 is provided with an opening which is lined with a bushing 56 having in turn a through opening which is polygonal in cross section and adapted to slidably fit the similarly shaped upper end of the shaft 12.

The outer end of the opening through bushing 56 is closed by a plug 58 secured to the socket 55 and having a cap overlapping the end of the socket and made of hardened material to resist upsetting in case, for any reason, the handle 54 is used as a hammer.

The handle 54 and thereby the shaft 12 and parts operated thereby are rotatable to a plurality of brake controlling positions which are designated in Fig. 2 of the drawings. It is desired that the handle 54 be removable from and applicable to the shaft 12 only in the handle off position, and to accomplish this end, the handle socket is provided at its inner end with a radially projecting lug 59 which extends into a groove 60 in the sleeve 8 and is freely rotatable therein. The length of this groove substantially equals the movement of the handle 54 between the release and automatic emergency positions. A groove 61 is provided longitudinally of the sleeve 8 opening at one and to the outer end of said sleeve and at the other end to the groove 60 adjacent the shoulder 62 formed at one end thereof. In the automatic emergency position of the handle 54, the lug 59 on said handle is adapted to be raised out of engagement with shoulder 62 and then turned to handle off position in which the lug 59 aligns with groove 60 following which the handle may be pulled out of sleeve 8.

The depending portion 11 of the casing 4 slidably fits in a bore 63 in the casing 17 and extends into the chamber 16. A gasket 64 is provided between the casings 4 and 17 to prevent leakage of fluid under pressure from chamber 16.

The shaft 12 is provided in chamber 16 with an enlarged concentric portion 65 having an axial bore 66 open at its lower end. A dowel pin 67 is provided through the side wall of the concentric portion 65 and extends into the bore 66 and beyond the outer face of said concentric portion.

A cam 68 is pressed on to the concentric portion 65 of the shaft 12 and is provided with a slot 69 which receives the dowel pin 67, said dowel pin acting to locate said cam on said concentric portion. This cam is provided for operating what is known as a self-lapping valve mechanism which is designated generally by the reference letter V, and the purpose of said valve mechanism is to control, by what is commonly termed "straight air", the brakes on one or more connected vehicles either directly or indirectly through the use of electric or pneumatic relays, which however is not pertinent to the invention.

The self-lapping valve mechanism V is substantially the same as that disclosed in Patent No. 2,042,112, issued to Ewing K. Lynn and Rankin J. Bush on May 26, 1936, and comprises a casing 70 secured to the casing 17 over an opening 71 formed in the side wall of casing 17. A gasket 72 is interposed between the casings 17 and 70 to prevent leakage of fluid under pressure from chamber 16.

The self-lapping valve mechanism V further comprises an application valve 73 slidably mounted in a suitable bore in the casing 70 and adapted to be urged into sealing engagement with a seat 74 by means of a spring 75. This valve has at its seating face a chamber 76 adapted to be supplied with fluid under pressure from a feed valve device (not shown) or from any other suitable source of fluid under pressure which may be connected to pipe 77, the communication between pipe 77 and chamber 76 not appearing in the sections of the device shown in the drawings since such is not pertinent to the invention.

The self-lapping valve mechanism also comprises an exhaust or release valve 78 disposed in a chamber 79 provided in a movable abutment in the form of a piston 80 and adapted to control communication between said chamber and chamber 16, which are connected through an opening 81, and a passage 82 which leads to a chamber 83 which is open to the atmosphere through a communication not appearing in the drawings. A spring 96 is provided in the piston 80 for unseating the release valve 78.

The movable abutment 80 is subject on one side to variations in the pressure of fluid in chamber 16 and on the opposite side to the pressure of an adjustable control spring 84 contained in chamber 83.

A plunger 85 is slidably mounted in a suitable bore provided in the casing 70 between the application valve 73 and exhaust valve 78 and in radial operating alignment with the operating or circumferential face 86 of the cam 68. The rounded end of a rocker arm 87 is disposed between the end of plunger 85 and the cam face 86, while the other end of said rocker arm is pivotally mounted on one end of a shaft 89 which is pressed into a bore provided through a partition wall 99 separating chamber 16 from a chamber 100 in the casing 17. A pin 88 is provided in the arm 87 and works in an annular groove formed in the shaft 89 for preventing the arm 87 from coming off of said shaft. It will be evident that since the shaft 89 is pressed into place there will be no leakage of fluid under pressure past said shaft between chambers 17 and 100.

A walking beam consisting of two spaced members 91 is pivotally mounted intermediate their ends on a pin 92 carried by the plunger 85. One end of both members 91 is connected by a pin 93 to one end of a plunger 94 the other end of which engages the seat face of the application valve 73. The other end of both members 91 are connected together by a pin 95 upon which is rotatably mounted a roller 97 which engages the release valve 78.

The cam 68 and the parts of the self-lapping valve mechanism V are shown in the brake release position corresponding to the position of the operating handle 54. In this position, spring 75 holds the application valve 73 in engagement with seat 74, the movable abutment 80 assumes its normal position due to the action of spring 84 and the spring 92 unseats the release valve 78, and with these valves thus conditioned the walking beam members 91 position the plunger 85 in engagement with one side of the rocker 87 while the other side of said rocker engages surface 86 of the cam 68. Under this condition the chamber 16 and thereby a straight air control pipe 98 which is connected to said chamber through a communication (not shown), are both vented to the atmosphere past the exhaust valve 78 to chamber 83 which is open to the atmosphere as hereinbefore described.

The operation of the self-lapping valve mechanism V to apply and release the brakes on a vehicle is controlled through the cam 68 by movement of the handle 54 between the release and full straight air and electric service positions.

When the handle 54 is turned in a counterclockwise direction from the release position indicated in Fig. 2 of the drawings, the cam 68 is thereby operated to urge the plunger 85 in a direction toward the right hand. This movement of plunger 85 causes the walking beam members 91 to fulcrum first on pin 93 to cause seating of the release valve 78 and then to fulcrum on the roller 97 to unseat the supply valve 73 which permits fluid under pressure to flow from chamber 76 to chamber 16 and from thence to pipe 98 through which a straight air application of the brakes is adapted to be effected.

The pressure of fluid thus obtained in chamber 16 acts on the piston 80 and moves same towards the right hand against the pressure of spring 84 which permits the pressure of spring 75 to move the supply valve 73 towards its seat. When the pressure of fluid in chamber 16 becomes sufficient, as called for by the position of the handle 54 and therefore cam 68, to move the piston 80 sufficiently against the increasing opposing pressure of spring 84, the supply valve 73 becomes seated to prevent further flow of fluid under pressure to chamber 16.

If the handle 54 is moved from release position only part way towards the full straight air and electric service position, then the plunger 85 is so positioned that the supply valve 73 will seat upon a relatively small movement of piston 80 so that the pressure obtained in chamber 16 to effect such movement against the relatively low pressure of spring 84 will be correspondingly low. If it is desired to increase the degree of application, the handle 54 is moved further towards the full straight air and electric service position and this causes the cam to again operate the plunger 85 to unseat the supply valve 73. Fluid under pressure is then again supplied to chamber 16 until the pressure therein is increased sufficiently to move the piston 80 a sufficient distance to again permit the supply valve 73 to be seated.

In a manner just explained the self-lapping valve mechanism V is adapted to be operated to graduate on an application of the brakes. The maximum throw of the cam 68 is obtained when the handle 54 is in the full straight air and electric service position and consequently in this position the maximum pressure is obtained in chamber 16. This maximum throw is maintained throughout further movement of the handle 54 and cam 68 past the full straight air and electric service position to the handle-off position so that during this further movement a full straight air application of the brakes is adapted to be maintained.

If it is desired to effect a release of the straight air brakes, the handle 54 is moved from or past the full straight air and electric service position towards release position. This turns the cam 68 so as to relieve pressure on plunger 85 and in turn on the release valve 78 whereupon spring 96 unseats said release valve which permits fluid under pressure to be vented from chamber 16 and pipe 98. As the pressure of fluid is thus reduced on piston 80, spring 84 urges said piston inwardly towards the release valve 78. If the handle is stopped in a position ahead of release position, then when the pressure in chamber 16 becomes reduced sufficiently the piston 80 moves into seating engagement with the release valve 78 and thereby holds in said chamber a pressure corresponding to the position of the handle 54. The handle 54 may thus be moved in steps toward the release position, and the release valve 78 and piston 80 will cooperate to reduce the pressure in chamber 16 and pipe 98 in corresponding steps. When full release position of the handle is attained, the force of spring 84 is sufficiently expended that spring 96 is able to maintain the release valve 78 unseated so that a complete release of fluid under pressure from chamber 16 and pipe 98 may occur.

A bushing 101 is provided in the partition wall 99 and has a bore in axial alignment with the bore in bushing 10. A key having a head 102 disposed in chamber 100 is provided with a shaft 103 which is journaled in the bushing 101 and extends through chamber 16 and into bore 66 in the extension 65 of shaft 12.

The end of the key shaft 103 is provided with a longitudinally extending slot 104 adapted to receive the dowel 67 for reasons which will be hereinafter described, and is also provided with a transverse slot 105 extending diametrically through the shaft and aligned with slots 106 in the shaft extension 65, and extending through these slots is a key 107 for providing a driving connection between shaft 12 and the key shaft 103.

A ring 108 is fitted over the key shaft 103 and engages the upper face of the bushing 101 and the spring 20 is interposed between this ring and the cam 68 for urging the portion 65 of the shaft 12 against the sealing ring 19. This ring is provided with an upstanding portion 109 which extends inside the coils at the lower end of spring 20 for centralizing said spring, and diametrically opposite slots are provided through this upstanding portion in which the lower portion of the key 107 fits whereby said ring is adapted to be turned with the shafts 12 and 103 and thus avoid twisting of the spring 20.

A sealing washer 110 is interposed between the key head 102 and a tapered surface formed on the lower end of the bushing 101 and a spring 111 is provided for urging said key head against said washer for preventing leakage of fluid under pressure from chamber 100 to chamber 16.

A rotary valve seat member 112 is interposed between the casing 17 and pipe bracket 1 and is secured to said casing by one or more screws 122. This member is provided with an integrally formed boss 113 which slidably fits into a bore formed in the bottom wall of casing 17 and open to chamber 100. On the end of this boss is formed a rotary valve seat 114 as clearly shown in Fig. 10 of the drawings.

A rotary valve seat element 115 is removably mounted in the member 112 and comprises an enlarged head section 116 having a sliding fit in a suitable bore opening at the lower face of said member, and a concentric portion 117 of smaller diameter having a sliding fit in a bore which opens at the opposite face of said member, said concentric portion extending above the upper face of said member. A centralizing ring 118 having a sliding fit on the concentric portion 117 of the seat element 115 is mounted on the upper face of member 112, and a plurality of spaced screws 119 are provided which extend through suitable bores in said ring and the member 112 and are screw threaded to the head section 116 of the element 115 whereby said element is secured to the member 112.

A rotary valve 120 is mounted to rotate on a seat formed on the end of the concentric portion 117 of the seat element 115, and the centralizing ring 118 extends above said seat around said rotary valve for holding same in place.

The centralizing ring slidably fits into a suitable bore 121 which is machined through the bottom wall of casing 17 concentric to the bore through bushing 101, so that the rotary valve 120 is accurately located in operating alignment with the key 103. An off center slot is provided through the outer end face of the rotary valve 120 in which slidably fits an off center extension 129 of the key head 102 whereby said rotary valve is adapted to be turned by the shaft 12 through the key shaft 103 and head 102. The spring 111 is contained in a recess in the extension 129 and acts in one direction on the key head 102 as hereinbefore described and in the opposite direction in the rotary valve 120 urging same into engagement with its seat.

It will be evident that due to the dowel 67 and slot 104 cooperating to ensure proper connection of the key shaft 103 to the main shaft 12, and due to the off center driving connection between the key head 102 and rotary valve 120, the assembly of these parts in their proper working relation is ensured.

The rotary valve seat boss 113 formed integral with member 112 extends only part way through the bore in the bottom wall of casing 17, which bore is machined concentric to that containing the shaft 89. A rotary valve 123 is rotatably mounted on the seat 114 provided in the end of boss 113 and slidably engages the casing 17 within the portion of the bore extending above the seat 114. By this construction it will be evident that when the seat member 112 is secured to casing 17, the rotary valve seat 114 and therefore the rotary valve 123 are accurately axially aligned with shaft 89.

An operating element 124 having gear teeth 125 on a portion of its perimeter is rotatably mounted on the portion of shaft 89 which extends into chamber 100. A snap ring 126 is provided in a suitable annular groove formed in the portion of the shaft which extends outside the hub of element 124 for holding said element in place.

The element 124 is provided off center with two oppositely disposed depending fingers 127 which slidably fit into corresponding off center recesses provided in the upper end face of the rotary valve 123 whereby a driving connection is obtained between said element and rotary valve. The operating element 124 is centrally recessed in its lower face to carry a spring 128 which is interposed between said element and the rotary valve 123 for urging said rotary valve against its seat.

An operating element 130 having gear teeth 133 on a portion of its periphery is pressed on to the key head 102 in operating alignment with the operating element 124. A dowel pin 132 is provided in the key head 102 and is adapted to enter a slot in the element 130 for locating said element on said head.

The portion of the operating element 130 not having teeth is of less diameter than the toothed portion and is disposed to turn in a cut away portion of the element 124. When the element 130 is turned sufficiently in a counterclockwise direction, as viewed in Fig. 7 of the drawings, for the leading tooth 133 to engage the tooth 134 on the element 124, then said elements turn together. Upon turning the element 130 in the reverse direction it will be evident that the element 124 turns therewith until the tooth 133 disengages tooth 135 after which the element 130 turns relative to the element 124.

In the drawings, and particularly in Fig. 7, the operating elements 130 and 124 are shown in their normal position, that is, the position assumed when the handle 54 is in release position as shown in Figs. 1 and 2. When the handle 54 is turned from release position in a counterclockwise direction as viewed in Fig. 2 of the drawings, to operate the contactor C and self-lapping valve mechanism V, the rotary valve 120 and operating element 130 are adapted to turn therewith. When the handle 54 reaches the full straight air and electric service position, the tooth 133 engages the tooth 134 so that during further movement of the handle 54, that is, from and between full straight air and electric service position to handle off position, the operating element 124 is turned by the element 130 so that the rotary valve 123 is turned to its various positions. In other words, the movement of handle 54 in the zone between release position and full straight air and electric service position is independent of the rotary valve 123, and since most braking of a vehicle will be effected by the electric and straight air brakes controlled in this zone, it will be evident that for the greater amount of operation of handle 54, the operator will be relieved of turning the rotary valve 124, which is very desirable in that it reduces fatigue. The rotary valve 123 which is movable only between full straight air and electric service position, and handle off position is provided for controlling an automatic brake system, that is, a system of the general type embodying a normally charged pipe from which fluid under pressure is adapted to be vented for effecting an application of the brakes, and it is not intended that this system be used except in case of an emergency such as due to failure of one or the other or both the electric and straight air brake systems.

The operating element 124 is provided on a portion of its periphery not having teeth with a quadrant 155 having five notches or shoulders corresponding in number and spacing to the positions of handle 54 between and including the full straight air and electric service position and handle off position, and a spring-pressed detent 136 provided in casing 17 is urged into said notches for defining said positions. The release position of the handle 54 and therefore the contactor C, self-lapping valve mechanism V and the small rotary valve 120 is defined by engagement of the lug 59 on the handle socket 55 with the end wall of groove 60 in the sleeve 8, as shown in Fig. 2 of the drawings.

As above explained, two rotary valve seats are provided on the member 112, the seat 114 being formed on the end of a raised integral portion, while the other rotary valve seat is provided on the end of the removable seat member 115. This is an important feature since it permits both seats to be properly finished, lapped and otherwise fitted to their respective rotary valves which would be impracticable if it were attempted to form both seats integral with the member 112.

It will further be noted that although the two rotary valve seats are provided on member 112 which is separate from casing 17, the sliding fit of boss 113 in the bore in the bottom wall of casing 17 and the sliding fit of the centralizing ring 118 in bore 121 in the bottom wall of casing 17, aligns both seats and their associated rotary valves axially with respect to the elements carried by the casing 17 for effecting the operation of said rotary valves.

An oil reservoir 140 is provided in casing 4 around the bushing 9 and is adapted to be filled with lubricant through an opening normally closed by a cap nut 141. The bushing 9 is preferably made of a special bearing metal through which lubricant from the reservoir 140 is adapted to gradually creep to the shaft 12 for lubricating the bearing between said shaft and the bushing 9.

For lubricating the bearing between shaft 12 and the bushing 10, and oil reservoir 142 is provided in the depending position 11 of casing 4 and is connected to a passage 143 extending to the outer face of said casing and normally closed by a cap nut 144. A ring 145 of oil carrying material such as felt is disposed in chamber 142 while a portion of passage 143 is packed with an oil carrying material such as lambs wool. Oil is adapted to be supplied to chamber 142, the felt ring 145 and lambs wool through passage 143 when the cap nut 144 is removed. A plurality of openings 146 are provided through the side wall of bushing 10 connecting chamber 142 to the shaft 12 and through these openings lubricant is adapted to seep from said chamber to said shaft and from thence to the sealing washer 19.

A felt ring 147 is interposed between a plate 148 pressed against the spring seat ring 108 and casing and is open to a passage 149 filled with material such as lambs wool. This passage leads to the outside of casing 17 where it is normally closed by a cap nut 150. The lambs wool in passage 149 is adapted to be saturated with lubricant from whence it creeps to the felt ring 147 for lubricating the bearing surface between the ring 108 and its bearing on the end of bushing 101. A passage 151 is provided through the bushing 101 through which oil from passage 149 is adapted to creep to the key shaft for lubricating said shaft and from thence to the sealing washer 110 for lubricating same.

A felt ring 152 is interposed between the upper face of cam 68 and the lower end of bushing 10 for collecting oil which may seep past the bearing washer 19 and from which such oil may creep along said cam to lubricate the face 86 thereof and the parts which engage said face. A similar felt ring 153 is disposed in the upper face of the operating element 130 for collecting oil which may seep past the sealing washer 110 and from which oil may creep to the gear teeth formed on said member for lubricating said teeth and the teeth formed on the operating member 124.

A felt ring 154 is interposed between the upper face of the operating element 124 and the partition wall 99 for carrying oil to lubricate the bearing between said element and partition wall 99 and shaft 89. This lubricating ring 154 is filled with lubricant only at the time the controller is assembled and such a supply of lubricant is considered adequate for the purpose intended since the operating element 124 is seldom moved as compared to the parts which move with the handle 54.

From the above description it will be noted that an improved brake controller is provided whereby a plurality of different braking systems may be controlled by a single operating handle and with the least possible effort on the part of the operator. The design is simple, compact and so arranged that proper assembling is ensured and the proper alignment of the different parts in working relation with each other is ensured.

While one illustrative embodiment of the invention has been described in detail, it is not my intention to limit its scope to that embodiment or otherwise than by the terms of the appended claims.

Having now described my invention, what I claim as new and desire to secure by Letters Patent, is:

1. In combination, a member having formed on an integral surface thereof a rotary valve seat, and an element secured to and removable from said member and having an exposed surface facing in the same direction as said integral surface, said exposed surface having formed thereon a rotary valve seat disposed in a plane parallel to that of the rotary valve seat on said integral surface.

2. In combination, a member having on one side two spaced rotary valve seats disposed in parallel planes, one of said rotary valve seats being formed on an integral portion of said member, and an element having a sliding fit in a recess in said member and secured to said member, the other rotary valve seat being formed on the exposed end of said element.

3. In combination, a casing having in one wall two spaced openings and in an opposite wall two spaced bores one in axial alignment with one of said openings and the other in axial alignment with the other of said openings, an operating shaft rotatably mounted in the bore opposite one opening, and another shaft mounted in the bore opposite the other opening, a member secured to said casing and having two spaced raised portions slidably fitting said two spaced openings, a rotary valve seat formed on the end of one of said raised portions, said member having a portion located axially of the other raised portion and having a rotary valve seat formed on the end thereof, a rotary valve mounted on the last mentioned seat in axial alignment with the operating shaft and connected thereto for rotation therewith, another rotary valve mounted on the other rotary valve seat, and a gear connection carried by said shafts and operatively connected to said other rotary valve whereby said other rotary valve is rotatable by said shaft.

4. In combination, two rotary valves, a handle for turning one of said rotary valves, an operating connection between said rotary valves for operating the other rotary valve upon movement of said handle to certain positions, said connection being inoperative upon movement of said handle to another position, a stop engageable by said handle in the other position for defining same, and means associated with said connection for defining said certain positions.

5. In combination, two rotary valves, a shaft for turning one of said rotary valves, a handle for operating said shaft, gear members operatively connecting said shaft to said other rotary valve and provided with gear teeth adapted to mesh upon a predetermined movement of said handle from its normal position for turning said other rotary valve to various positions upon further movement of said handle, a stop engageable by said handle for defining the normal position thereof, and pressure means cooperative with one of said gear members for defining said various positions.

6. In combination, a casing, a partition wall in said casing forming two separate chambers and having a bore, a rotary valve disposed in one of said chambers in axial alignment with said bore, a shaft rotatably mounted in said bore and having driving connection with said rotary valve and extending into said other chamber, another shaft extending into said other chamber in axial alignment with the first mentioned shaft for driving same, means operatively connecting one shaft to the other, a self-lapping valve mechanism secured to said casing and communicating with said other chamber, a cam associated with the driving shaft in said other chamber in operating relation with said self-lapping valve device for controlling the operation thereof, and a handle mounted on said driving shaft for operating same.

7. In combination, a device having two spaced axially aligned bores, a shaft mounted to rotate in one of said bores and having an enlarged portion, a sealing washer interposed between said enlarged portion and the adjacent face of said device, a shaft mounted to rotate in the other bore and having an enlarged portion, a sealing washer interposed between the enlarged portion of the last mentioned shaft and the adjacent face of said device, resilient means acting on the last mentioned shaft urging the enlarged portion thereof into sealing engagement with its sealing washer, one end of both shafts extending into the space between said bores with the end of one shaft slidably engaging the adjacent end of the other shaft within an axial bore formed in the end thereof, a key slidably mounted in a transverse slot extending through the engaging end portions of said shafts for providing a driving connection between said shafts, a spring surrounding the engaging end portions of said shafts and surrounding said key for holding said key in place and acting on the enlarged portion of the first mentioned shaft urging same into sealing engagement with its sealing washer, a spring seat mounted over the second mentioned shaft and slidably engaging a face of said casing and carrying said spring, said key having a driving connection with said spring seat for turning same with said shafts.

8. A manually operated controller for controlling an electric braking system, a straight air fluid pressure braking system and an automatic fluid pressure braking system on a vehicle, said controller comprising a shaft, a handle for selectively turning said shaft to each of a plurality of brake controlling positions, a contactor carried by said shaft for controlling the electric braking system, a cam operative by said shaft for controlling the straight air braking system, another shaft operatively connected to the first mentioned shaft for controlling the automatic fluid pressure braking system, key means locating said contactor on the first mentioned shaft in proper relation to said handle, and a pin carried by the first mentioned shaft locating said cam and other shaft in proper relation to the first mentioned shaft and thereby to said handle.

9. A manually operated controller for controlling an electric braking system, a straight air fluid pressure braking system and an automatic fluid pressure braking system on a vehicle, said controller comprising a plurality of casing sections secured together, a shaft rotatably mounted in one casing section, valve means associated with a second casing section and operative by said shaft and forming a part of said automatic fluid pressure braking system, a self-lapping valve device associated with said one casing section and forming a part of said straight air fluid pressure braking system, a main shaft journaled in a third casing section and operatively connected to the first mentioned shaft for operating same, cam means carried by said main shaft for controlling the operation of said self-lapping valve device, a contactor carried and operative by said main shaft and forming a part of said electric brake system, and a handle for turning said main shaft and thereby said other shaft, and means associated with each of said casing sections for automatically aligning in working relation said shafts and valve means upon securing said casing sections to each other.

10. In combination, a member having a bore of one diameter extending part way through said element and opening at one face thereof and having a larger, concentric bore extending through the remainder of said member and opening at an opposite face thereof, an element comprising a portion having a sliding fit in said larger bore and engaging the end wall thereof and a concentric portion of smaller diameter extending into the smaller bore in said member and having formed on the end face thereof a rotary valve seat, and means securing said element to said member.

11. In combination, a casing having in one wall two spaced openings and in an opposite wall two spaced bores one in axial alignment with one of said openings and the other in axial alignment with the other of said openings, an operating shaft rotatably mounted in one of said bores, another shaft rotatably mounted in the other of said bores, means secured to said casing and having two spaced raised portions slidably fitting said two spaced openings, a rotary valve seat formed on the end of each of said raised portions concentric to the respective openings containing said raised portions, a rotary valve mounted on one of said seats and operatively connected to the axially aligned shaft, another rotary valve mounted on the other rotary valve seat and operatively connected to the axially aligned shaft, means connecting said shafts for turning one of said shafts upon rotation of the other, and means for rotating said other shaft.

12. In combination, a casing having in one wall two spaced openings and in an opposite wall two spaced bores, an operating shaft rotatably mounted in one of said bores, another operating shaft rotatably mounted in the other of said bores, means secured to said casing having two spaced raised portions slidably fitting said openings, a rotary valve seat formed on the end of one of said raised portions concentric to one of said shafts, a rotary valve seat formed on the end of the other raised portion concentric to the other of said shafts, a rotary valve on each of said seats operatively connected to the respective axially aligned shaft, means connecting said shafts for turning one of said shafts upon rotation of the other, and means for rotating said other shaft.

13. In combination, one means for controlling the braking of a vehicle, other means for controlling the braking of the vehicle, an operating member movable in a zone for controlling the operation of one of said means, and movable out of said zone and to various positions for controlling the operation of the other of said means, means for defining the end of said zone most remote from said positions, and other means operative only upon movement of said member to the other end of said zone and to said various positions for defining same.

14. In combination, one means for controlling the braking of a vehicle, other means for controlling the braking of the vehicle, an operating member movable in a zone for controlling the operation of one of said means independently of the other of said means and movable out of said zone to various positions for controlling the operation of said other means, means for defining the end of said zone most remote from said positions, and other means for defining the other end of said zone and each of said positions.

15. In combination, one means for controlling the braking of a vehicle, other means for controlling the braking of the vehicle, an operating member movable in a zone for controlling the operation of one of said means, and movable out of said zone and to various positions for controlling the operation of the other of said means, a stop engageable by said member for defining the end of said zone most remote from said positions, and pressure means operative only after movement of said member to the other end of said zone to oppose further movement of said member and to define said other end of said zone and said several positions.

16. In combination, one means for controlling the braking of a vehicle, other means for controlling the braking of the vehicle, an operating member movable in a zone for controlling the operation of one of said means, and movable out of said zone and to various positions for controlling the operation of the other of said means, and pressure means operative to define said several positions and to oppose movement of said member out of said zone to said positions and from one to the other of said positions, said member being movable in said zone independently of said pressure means.

17. In combination, means for electrically controlling the braking of a vehicle, means for pneumatically controlling the braking of a vehicle, a manually operative handle having a normal position and movable therefrom through a zone for controlling the operation of the electric control means independently of the pneumatic control means and movable out of said zone to various positions for controlling the operation of said pneumatic control means, and pressure means operative after movement of said handle from said normal position through said zone for opposing movement of said handle out of said zone and to said several positions and for defining said several positions.

18. In combination, self-lapping valve mechanism for controlling the brakes on a vehicle, a handle movable from a normal position through a zone of travel for controlling the operation of said mechanism, other means for controlling the brakes on a vehicle, said handle being movable out of said zone to several positions for controlling the operation of said other means, and pressure means associated with said other means and operative only after movement of said handle through said zone to oppose movement of said handle and to define said several positions.

19. A manually operated controller for controlling an electric braking system, a straight air fluid pressure braking system and an automatic fluid pressure braking system, said controller comprising a shaft, a handle for turning said shaft to a plurality of brake controlling positions, means operative by said shaft for controlling the electric braking system, means locating the electric brake control means on said shaft in proper working relation to said handle, other means operative by said shaft for controlling the straight air fluid pressure braking system, another shaft operatively connected to the first mentioned shaft for controlling the automatic fluid pressure braking system, and an element associated with said shafts and the means for controlling the straight air braking system for locating the straight air brake control means and said other shaft in proper working relation to the first mentioned shaft and thereby said handle.

20. A manually operated brake controller for controlling at least two different braking systems, said controller comprising a casing, a shaft in said casing for controlling one of said systems, a handle for operating said shaft, another shaft for controlling the other braking system, said shafts being in axial alignment and the inner end of one of said shafts having a transverse slot aligned with a transverse slot in the adjacent end of the other shaft, a key disposed in both of said slots forming a driving connection between said shafts, said key having sliding contact with the side walls of said slots, and a spring surrounding the adjacent ends of said shafts and said key for holding said key in said slots.

21. A manually operated brake controller for controlling at least two different braking systems, said controller comprising a casing, a shaft in said casing for controlling one of said systems, a handle for operating said shaft, another shaft for controlling the other braking system, said shafts being in axial alignment, with their adjacent ends in telescopic engagement and having a slot extending through the telescoped ends, a key disposed in said slot forming a driving connection between said shafts, said key having a sliding fit with the side walls of said slot, and a spring surrounding the telescoped ends of said shafts for holding said key in said slot.

22. A manually operated brake controller for controlling at least two different braking systems, said controller comprising a casing, a shaft in said casing for controlling one of said systems, a handle for operating said shaft, another shaft for controlling the other braking system, said shafts being in axial alignment and the inner end of one of said shafts having a transverse slot aligned with a transverse slot in the adjacent end of the other shaft, a key disposed in both of said slots forming a driving connection between said shafts, said key having sliding contact with the side walls of said slots, and said slots being wider than said key whereby said shafts are capable of adjustment relative to each other in the direction of their length, and a spring surrounding the adjacent ends of said shafts and said key for holding said key in said slots.

23. A manually operated brake controller for controlling at least two different braking systems, said controller comprising a casing, a shaft in said casing for controlling one of said systems, a handle for operating said shaft, another shaft for controlling the other braking system, said shafts being in axial alignment and the inner end of one of said shafts having a transverse slot aligned with a transverse slot in the adjacent end of the other shaft, a key disposed in both of said slots forming a driving connection between said shafts, said key having sliding contact with the side walls of said slots, and a spring surrounding the adjacent ends of said shafts and said key for holding said key in said slots and acting on one of said shafts for urging it to a predetermined position in said casing.

24. A manually operated brake controller for controlling at least two different braking systems, said controller comprising a casing, a shaft in said casing for controlling one of said systems, a handle for operating said shaft, another shaft for controlling the other braking system, said shafts being in axial alignment and the inner end of one of said shafts having a transverse slot aligned with a transverse slot in the adjacent end of the other shaft, a key disposed in both of said slots forming a driving connection between said shafts, said key having sliding contact with the side walls of said slots, a ring surrounding one of said shafts and slidably engaging said casing and having a slot in which said key is disposed for turning said ring with said shafts, and a spring surrounding the adjacent ends of said shafts and said key with one end supported on said ring and the other end acting on the other of said shafts for urging same to a predetermined position in said casing, said spring also acting to hold said key in said slots.

RANKIN J. BUSH.